(12) United States Patent
Revanur et al.

(10) Patent No.: US 11,305,354 B2
(45) Date of Patent: Apr. 19, 2022

(54) MACHINE CONTROL FOR ADDITIVE MANUFACTURING PROCESS AND APPARATUS

(71) Applicant: RENISHAW PLC, Wotton-under-Edge (GB)

(72) Inventors: Ramkumar Revanur, Stafford (GB); Ceri Brown, Redland (GB)

(73) Assignee: RENISHAW PLC, Wotton-under-Edge (GB)

( * ) Notice: Subject to any disclaimer, the term of this patent is extended or adjusted under 35 U.S.C. 154(b) by 779 days.

(21) Appl. No.: 15/775,133

(22) PCT Filed: Nov. 14, 2016

(86) PCT No.: PCT/GB2016/053559
§ 371 (c)(1),
(2) Date: May 10, 2018

(87) PCT Pub. No.: WO2017/085469
PCT Pub. Date: May 26, 2017

(65) Prior Publication Data
US 2018/0370144 A1    Dec. 27, 2018

(30) Foreign Application Priority Data

Nov. 16, 2015  (IN) ............................ 3729/DEL/2015
Nov. 16, 2015  (IN) ............................ 3730/DEL/2015
(Continued)

(51) Int. Cl.
*B33Y 30/00*     (2015.01)
*B22F 10/30*     (2021.01)
(Continued)

(52) U.S. Cl.
CPC .............. *B22F 10/30* (2021.01); *B22F 10/00* (2021.01); *B29C 64/153* (2017.08);
(Continued)

(58) Field of Classification Search
CPC ... B29C 64/153; B29C 64/245; B29C 64/393; B29C 64/268; B33Y 10/00
(Continued)

(56) References Cited

U.S. PATENT DOCUMENTS 5,182,715 A   1/1993  Vorgitch et al.
5,844,673 A   12/1998 Ivers
(Continued)

FOREIGN PATENT DOCUMENTS

CN      1135732 A      11/1996
CN    101821081 A       9/2010
(Continued)

OTHER PUBLICATIONS

Feb. 24, 2016 Search Report issued in British Patent Application No. 1600122.4.
(Continued)

*Primary Examiner* — Jeffrey M Wollschlager
*Assistant Examiner* — Xue H Liu
(74) *Attorney, Agent, or Firm* — Oliff PLC (57) ABSTRACT

A method controls an additive manufacturing apparatus, in which an object is built by consolidating material in a layer-by-layer manner. The method includes receiving commands to be executed by the additive manufacturing apparatus to cause the additive manufacturing apparatus to carry out a build of an object, wherein each command includes an identifier identifying a time during the build at which the command is to be executed, and executing each command on the additive manufacturing apparatus in accordance with
(Continued)

the time identified by the associated identifier. Further, an apparatus and a data carrier carry out the method.

25 Claims, 5 Drawing Sheets (30) Foreign Application Priority Data

Jan. 5, 2016 (EP) .................................... 16150243
Jan. 5, 2016 (GB) .................................... 1600122

(51) Int. Cl.

| | |
|---|---|
| *B33Y 50/02* | (2015.01) |
| *G05B 19/4093* | (2006.01) |
| *B22F 10/00* | (2021.01) |
| *B29C 64/153* | (2017.01) |
| *B29C 64/393* | (2017.01) |
| *B29C 64/245* | (2017.01) |
| *B29C 64/268* | (2017.01) |
| *B22F 10/10* | (2021.01) |
| *B33Y 10/00* | (2015.01) |

(52) U.S. Cl.
CPC .......... *B29C 64/245* (2017.08); *B29C 64/268* (2017.08); *B29C 64/393* (2017.08); *B33Y 30/00* (2014.12); *B33Y 50/02* (2014.12); *G05B 19/4093* (2013.01); *B22F 10/10* (2021.01); *B33Y 10/00* (2014.12); *Y02P 10/25* (2015.11)

(58) Field of Classification Search
USPC ........................................................ 264/482
See application file for complete search history.

(56) References Cited

U.S. PATENT DOCUMENTS

| | | | |
|---|---|---|---|
| 5,926,188 | A | 7/1999 | Kawamoto et al. |
| 6,126,884 | A | 10/2000 | Kerekes et al. |
| 6,325,961 | B1 | 12/2001 | Beers et al. |
| 8,040,530 | B2 | 10/2011 | Cooper |
| 8,681,352 | B2 | 3/2014 | Shenoy et al. |
| 2013/0168902 | A1 | 7/2013 | Herzog et al. |
| 2013/0199748 | A1 | 8/2013 | Christensen et al. |
| 2013/0316081 | A1 | 11/2013 | Kovalcik et al. |
| 2015/0135897 | A1 | 5/2015 | Sutcliffe et al. |
| 2015/0375456 | A1 | 12/2015 | Cheverton et al. |
| 2016/0082668 | A1 | 3/2016 | Perret et al. |
| 2016/0184893 | A1 | 6/2016 | Dave et al. |
| 2018/0056390 | A1 | 3/2018 | O'Neill |
| 2018/0169948 | A1 | 6/2018 | Coeck et al. |
| 2018/0370144 | A1 | 12/2018 | Revanur et al. |

FOREIGN PATENT DOCUMENTS

| | | |
|---|---|---|
| CN | 104507601 A | 4/2015 |
| DE | 10 2012 221 218 A1 | 5/2013 |
| DE | 10 2015 000 103 A1 | 7/2016 |
| DE | 10 2015 113 700 A1 | 10/2016 |
| EP | 1 026 564 A2 | 8/2000 |
| EP | 1 847 377 A2 | 10/2007 |
| EP | 2 829 386 A1 | 1/2015 |
| GB | 2 491 472 A | 12/2012 |
| JP | H09-185721 A | 7/1997 |
| JP | H11-198235 A | 7/1999 |
| JP | 2003-245981 A | 9/2003 |
| JP | 2005-527025 A | 9/2005 |
| JP | 2008-155538 A | 7/2008 |
| JP | 2009-6509 A | 1/2009 |
| JP | 2013-067018 A | 4/2013 |
| WO | 95/11100 A1 | 4/1995 |
| WO | 2007/147221 A1 | 12/2007 |
| WO | 2010/007396 A1 | 1/2010 |
| WO | 2013/156119 A1 | 10/2013 |
| WO | 2014/199134 A1 | 12/2014 |
| WO | 2014/207454 A1 | 12/2014 |
| WO | 2015/040433 A2 | 3/2015 |
| WO | 2015/140547 A1 | 9/2015 |
| WO | 2015/195909 A1 | 12/2015 |
| WO | 2016/156824 A1 | 10/2016 |
| WO | 2016/198885 A1 | 12/2016 |
| WO | 2016/201390 A1 | 12/2016 |

OTHER PUBLICATIONS

Feb. 24, 2017 International Search Report issued in International Patent Application No. PCT/GB2016/053559.

Feb. 24, 2017 Written Opinion of the International Searching Authority issued in International Patent Application No. PCT/GB2016/053559.

U.S. Appl. No. 16/341,246, filed Apr. 11, 2019 in the name of Brown et al.

Mar. 26, 2018 International Search Report issued in International Patent Application No. PCT/GB2017/053384.

Mar. 26, 2018 Written Opinion of the International Searching Authority issued in International Patent Application No. PCT/GB2017/053384.

Jul. 4, 2017 Search Report issued in British Patent Application No. 1707807.2.

May 19, 2021 Notice of Allowance issued in U.S. Appl. No. 16/341,246.

MACHINE CONTROL FOR ADDITIVE MANUFACTURING PROCESS AND APPARATUS

FIELD OF INVENTION

This invention concerns machine control and, in a particular, but not exclusively, control of additive manufacturing apparatus, such as material bed (powder or resin bed) additive manufacturing apparatus.

BACKGROUND

Additive manufacturing or rapid prototyping methods for producing parts comprise layer-by-layer solidification of a flowable material. There are various additive manufacturing methods, including powder bed systems, such as selective laser melting (SLM), selective laser sintering (SLS), electron beam melting (eBeam) and stereolithography, and non-powder bed systems, such as fused deposition modelling, including wire arc additive manufacturing (WAAM).

In selective laser melting, a powder layer is deposited on a powder bed in a build chamber and a laser beam is scanned across portions of the powder layer that correspond to a cross-section (slice) of the workpiece being constructed. The laser beam melts or sinters the powder to form a solidified layer. After selective solidification of a layer, the powder bed is lowered by a thickness of the newly solidified layer and a further layer of powder is spread over the surface and solidified, as required. In a single build, more than one workpiece can be built, the parts spaced apart in the powder bed.

Existing selective laser melting apparatus operate by sending a sequential stream of instructions to the hardware such that operations of the machine are carried out in sequence. For example, a sequence of lowering the build platform, forming a layer by spreading powder across the lowered build platform with the wiper and then scanning the powder layer with the laser beam. With such a sequential control system, there is a degree of uncertainty with when each instruction will be executed hindering accurate predictions of the build process.

The amount of time that passes between operations is important for accurately calculating, or simulating, how much heat is in a workpiece being manufactured at a point in time and therefore, an amount of energy to input into the part to achieve a desired result. The uncertainty in the current machine operations is sufficient to make calculating, or simulating, the amount of heat in the workpiece extremely difficult.

Furthermore, WO2015/140547 discloses a selective laser solidification apparatus wherein an energy beam, such as a laser beam, is scanned across a powder bed to consolidate powder either side of a wiper when the wiper is moving across the powder bed. Such a method can be implemented using sequential execution of instructions by inserting the wiper motion commands into a sequential stream of commands for steering the laser such that the wiper is moved in sufficient time from an area of the powder to be processed with the laser to avoid the collision of the laser beam with the wiper. However, the uncertainties in the timing of the executions requires an ordering of the commands to include sufficient safety margins, which may result in consequential inefficiencies in the additive build process.

WO2015/140547 discloses the use of multiple lasers to scan overlapping zones of the powder bed. The use of multiple lasers increases the above challenges. In particular, to determine the energy input required to consolidate material, it is important to know with high accuracy the times at which adjacent regions of material are consolidated. Without accurate knowledge of the timing between consolidations of adjacent regions, too little or too much energy may be input into a region during consolidation resulting in an unacceptable build. This becomes more acute as more lasers are used and the timings between consolidations of adjacent regions becomes shorter. Again, rules may be implemented to ensure that adjacent areas are not consolidated within a specified time threshold to ensure that a region has sufficiently cooled before an adjacent region is consolidated. However, this introduces limitations on the scanning process, and consequential inefficiencies in the additive build process.

SUMMARY OF INVENTION

According to a first aspect of the invention there is provided a method of controlling an additive manufacturing apparatus, in which an object is built by consolidating material in a layer-by-layer manner, the method comprising receiving commands to be executed by the additive manufacturing apparatus to cause the additive manufacturing apparatus to carry out a build of an object, wherein each command is associated with an identifier identifying a time at which the command is to be executed, and executing each command on the additive manufacturing apparatus in accordance with the time identified by the associated identifier.

The command may comprise the identifier identifying the time during the build at which the command is to be executed.

The additive manufacturing apparatus may comprise a plurality of sub-systems. The method may comprise receiving commands to be executed by the additive manufacturing apparatus to cause the plurality of subsystems of the additive manufacturing apparatus to carry out the build of the object, wherein each command comprises the identifier identifying the time during the build at which the command is to be executed.

In this way, the timing of actions of the additive manufacturing apparatus is predetermined such that accurate calculations and/or simulations for the additive build can be made. In particular, it is possible to accurately calculate a required energy input based upon the known timings. Furthermore, for an additive manufacturing apparatus in which actions are executed simultaneously, such as those described in WO2015/140547 and WO2014/199134, timing between simultaneous actions can be controlled to produce a desired effect.

The commands may be such that execution of the commands at the identified times causes two or more actions of the additive build to occur simultaneously. For example, the actions may be scanning of an energy beam simultaneously with scanning of another energy beam, moving of a wiper to form a layer of material and/or moving of a build platform supporting the object being built.

The commands may include commands for controlling movement of a steering module for steering an energy beam to consolidate material at desired locations, for controlling movement of a wiper in the formation of a material layer, for controlling movement of a platform that supports the object as it is built, for controlling a heating device for pre-heating selected areas of a layer of material before consolidation and/or for controlling a device for plastically deforming consolidated material before formation of a subsequent layer (for example, a device as described in GB2491472).

The identifier may identify a time relative to a start time of the build, a so called "absolute build time". Alternatively, the identifier may identify a time relative to another action of the build process, a so called "relative build time". A relative time system may allow for a build to continue in the event of failure of the additive manufacturing apparatus to complete a task within an expected time, such as temporary jamming of the wiper. In both cases, the device of the additive manufacturing apparatus executing commands may be notified of a time zero from which a time for execution of the command is determined. For a relative build time system, the times at which different commands are executed may be calculated relative to different time zeros. The time zero for one command may be a time at which another command is completed or a time at which a specified state of a sub-system of the additive manufacturing apparatus occurs.

The commands may be executed based upon signals from a master clock of a central controller of the additive manufacturing apparatus. Alternatively, the commands may be executed based upon signals from a local clock local to a device for executing the command, the method comprising synchronising the local clock(s) to a master clock of a central controller of the additive manufacturing apparatus.

The method may comprise time stamping sensor data obtained by sensors for monitoring the additive build with a time that can be linked back to actions that were executed at that time. For example, the sensor data may be time stamped based upon signals from the master clock used for determining the time of execution of the commands or signals from a local clock synchronised with the master clock. The time stamp may comprise a time corresponding to the time used in the identifiers associated with the commands (e.g. from a time from an equivalent time zero, such as a build start time). In the latter embodiment, the method may comprise synchronising the local clock with the master clock at the start of the build.

Each command may specify actions to be carried out by a plurality of the subsystems. Execution of each command may comprise generating a plurality of sub-commands to be executed by the subsystems. Accordingly, the identifier may identify a time at which a central controller generates sub-commands that are sent to the sub-systems.

The plurality of sub-systems may comprise a sensor for monitoring a parameter of the additive manufacturing process, wherein the commands or sub-commands comprise a sensor command for causing the sensor to capture a sensor value. The sensor command may include the identifier. The method may comprise the sensor sub-system executing the sensor command to capture a sensor value with the sensor and generating a sensor data package including the sensor value labelled with the identifier contained in the command that caused that sensor value to be generated. The method may comprise associating the sensor value with a defined location in a build volume or the object based upon the identifier labelling the sensor value and one or more commands or further sensor values from a further sensor having a corresponding identifier, wherein a position of a subsystem of the apparatus can be determined from the one or more commands or further sensor values.

For example, the position of the subsystem may be determined from a demand position in the command comprising the corresponding identifier or a further sensor value, such as a further sensor value from a position encoder, measuring the position of the subsystem. The latter embodiment may generate more accurate position values as an actual position of the subsystem may differ from the demand position.

The method may comprise generating a further sensor data package including the further sensor value and the identifier contained in the command that caused that further sensor value to be generated and determining a defined position to be associated with the sensor value based upon the further sensor value that is labelled with the corresponding identifier.

The subsystem may be a steering element for steering an energy beam to consolidate material in a layer-by-layer manner and the defined position determined from a position of the steering element or a position in a build volume or working plane to which an energy beam is directed by the steering element. A position of the steering element, such as a steering optic, may be measured by the position encoder.

The subsystem may be a wiper for spreading powder material in layers and the defined position determined from a position of a surface, such as a lower edge, of the wiper in the additive manufacturing apparatus. A position of the wiper may be measured by the position encoder.

The subsystem may be a platform for supporting the object during the build, the platform movable relative a working plane where material is consolidated and the defined position determined from a position of the platform relative to the working plane. WO2015/140547 discloses how two different layers of powder may be consolidated during a single stroke of the wiper and, in such an embodiment, the powder material is consolidated in two different working planes. The position of the platform may be measured by the position encoder.

It will be understood that a position within the build volume and/or object may be determined from a combination of the position (measured or demand position) of the sub-systems, such a combination of the position of the steering elements and the position of the movable platform.

The defined location may be a capture location for the sensor value. For example, the sensor sub-system may comprise a sensor for generating a sensor value and a directing element for directing the sensor to capture a sensor value from a defined location in a working plane (such as a surface of a powder bed) or volume. The directing element may be movable steering optics of a scanner through which a sensor views the powder bed, an example of such a sensor disclosed in WO2007-147221 and WO2015-040433 or a wiper on which the sensor is mounted, an example of such a wiper mounted sensor disclosed in WO2013-156119.

The defined location may be a location of a consolidation region, such as a melt region, at a time the sensor value is captured. For example, the sensor may be an acoustic sensor and the sensor value a characteristic of the consolidation region as determined from the acoustic sensor. Sensor values from other sensors may be associated with a location of a consolidation region, such as sensor values from oxygen sensors for measuring an oxygen level in a build chamber.

The method may comprise visualising the sensor values based upon the defined locations. The sensor values may be visualised in a two, three or multi-dimensional representation based upon the defined locations. For example, the sensor values may be visualised in a two or three dimensional representation in respect of a capture location of the sensor value on the object.

It will be understood that the "corresponding identifier" means an identifier for a subsystem which corresponds to a command executed by the subsystem at the time the sensor value is captured. However, the identifier of the command may have been selected taking into account delays between sending the command to the subsystem at the time indicated by the identifier and execution of the command by the subsystem. Such delays could be due to delays in communication and/or the dynamics, such as inertia, of the subsystem. Accordingly, for a particular subsystem, the corresponding identifier to the identifier labelling the sensor value may be a different time taking into account differences in delays between a command activating the sensor and a command activating the subsystem. The corresponding identifier for a particular sub-subsystem can be determined from a calibration (pre-build) of the additive manufacturing apparatus. Accordingly, the method may comprise determining the corresponding identifier from a look-up table or calibration function for a particular sub-system. However, in many circumstances, the corresponding time will be the same time as that of the identifier associated with the sensor value.

According to a second aspect of the invention there is provided a controller for controlling an additive manufacturing apparatus, in which an object is built by consolidating material in a layer-by-layer manner, the controller comprising a processor, wherein the processor is arranged to carry out the method of the first aspect of the invention.

The controller may comprise a master clock, wherein the processor is arranged to cause the additive manufacturing apparatus to execute commands based upon signals from the master clock and the times specified by an identifier associated with each command.

According to a third aspect of the invention there is provided an additive manufacturing apparatus comprising a controller according to the second aspect of the invention.

The additive manufacturing apparatus may comprise two or more devices used for consolidating material in layers, the controller arranged to cause execution of commands such that the two or more devices carry out actions simultaneously. The devices may comprise a combination of one or more steering devices for steering one or more energy beams or plasma jets, a wiper for forming a layer of material and/or a movable build platform supporting the object. The one or more devices may comprise local clocks and the controller may be arranged to synchronise the local clocks to a master clock of the controller.

According to a fourth aspect of the invention there provided a data carrier having instruction stored thereon, which, when executed by a processor of an additive manufacturing apparatus causes the processor to carry out the method of the first aspect of the invention.

According to a fifth aspect of the invention there is provided a method of generating instructions for controlling an additive manufacturing apparatus, in which an object is built by consolidating material in a layer-by-layer manner, the method comprising receiving build data defining how an object is to be built in a layer-by-layer manner and generating from the build data commands to be executed by the additive manufacturing apparatus, the commands having associated therewith an identifier identifying a time during the additive build at which the command is to be executed by the additive manufacturing apparatus.

The build data may define layers of the object to be built in the additive process and an initial set of scan parameters for an energy beam or plasma jet to follow to consolidate material to form the layers. Generating the commands may comprise determining from the initial scan parameters a time between scanning adjacent areas of material and determining a modified set of scan parameters for the energy beam or plasma jet to follow based upon the time between the scanning of adjacent areas. The scan parameters may be parameters that affect the energy density of the energy beam, such as spot size and power of the energy beam. The scan parameters may include scan speed, or point distance and exposure time (in a point scanning system such as the Renishaw AM250) and/or hatch distance. The modified set of scan parameters may be determined based upon a thermal model of heat dissipation from consolidated regions with build time.

The method may comprise determining the identifiers for the commands based upon a known delay between sending of the commands and execution of the commands by subsystems of the additive manufacturing apparatus. The method may comprise determining from a look-up table or calibration function the known delay for a particular subsystem and determining the identifier for commands for that particular subsystem based upon the known delay.

According to a sixth aspect of the invention there is provided a system comprising a processor, the processor arranged to carry out the method of the fifth aspect of the invention.

According to a seventh aspect of the invention there provided a data carrier having instruction stored thereon, which, when executed by a processor causes the processor to carry out the method of the fifth aspect of the invention.

According to an eighth aspect of the invention there is provided a data carrier having thereon a build file for instructing an additive manufacturing apparatus in the building of an object in a layer-by-layer manner, the build file comprising commands, which, when executed by device of the additive manufacturing apparatus, cause the object to be built and, each command having associated therewith, an identifier identifying a time at which the command is to be executed by the additive manufacturing apparatus.

According to a ninth aspect of the invention there is provided a method of controlling a machine comprising a plurality of devices, the method comprising receiving commands to be executed by the machine, wherein each command is associated with an identifier identifying a time at which the command is to be executed, and executing each command on the machine in accordance with the time identified by the associated identifier.

The machine may be a manufacturing apparatus, such as an additive manufacturing apparatus or a subtractive manufacturing apparatus, such as a machine tool. The machine may be metrology apparatus, such as a coordinate measuring machine and/or a probe head for moving a contact probe about one or more axes.

According to a tenth aspect of the invention there is provided a controller for controlling a machine, the controller comprising a processor, wherein the processor is arranged to carry out the method of the ninth aspect of the invention.

According to an eleventh aspect of the invention there is provided a machine comprising a controller according to the tenth aspect of the invention.

According to a twelfth aspect of the invention there provided a data carrier having instruction stored thereon, which, when executed by a processor of a machine causes the processor to carry out the method of the ninth aspect of the invention.

According to a thirteenth aspect of the invention there is provided a method of manufacturing an object using an additive manufacturing apparatus, in which material is consolidated in a layer-by-layer manner to form the object, the method comprising receiving sensor values captured by the additive manufacturing apparatus during manufacture of the object, each sensor value associated with a time at which the sensor value was captured; for each sensor value, determining a coordinate value in the build volume or on the object based upon the time and associating the sensor value with the determined coordinate value.

The coordinate value in the build volume may be determined from demand data used for driving the additive manufacturing apparatus, wherein the demand data is associated with a time at which demand as specified in the demand data is to be satisfied. The demand data may comprise commands sent to the additive manufacturing apparatus for execution, wherein each command comprises an identifier identifying a time at which the command is to be executed. The demand data may comprise scanning instructions, such as determined by software packages such as QuantAM supplied by Renishaw, from which commands for instructing an additive manufacturing apparatus are determined. Such scanning instructions typically comprise scan paths and scan speeds, which may be defined in various ways, for example as scan vectors and scan speeds or as scan vectors, point distances and exposure times. From the scanning instructions, a coordinate at which material is consolidated at a particular time may be determined.

The coordinate value may be determined from one or more further sensor values from the additive manufacturing apparatus labelled with a time corresponding to the time with which the sensor value is associated. For example, the sensor values may be derived from sensors for measuring the position of subsystems of the additive manufacturing apparatus.

The method may comprise visualising the sensor values based upon the coordinate values associated with the sensor values. The sensor values may be visualised in a two, three or multi-dimensional representation based upon the coordinate values. For example, the sensor values may be visualised in a two or three dimensional representation in respect of a capture location of the sensor value on the object.

The sensor value to be visualised may be from a sensor for capturing a melt region or a sensor value for capturing another parameter of the build process. For example the sensor may comprise a sensor for measuring geometric dimensions of a layer, such as a metrology sensor mounted on the wiper or an optical probe for measuring geometry of the layer, a temperature sensor, for example for measuring a temperature of a layer or of a build chamber of the additive manufacturing apparatus, an oxygen sensor for measuring an oxygen level in the build chamber, a sensor for measuring power of the energy beam, gas flow velocity/pump speed, pressure across a condensate filter and/or an acoustic sensor for measuring acoustic signals in the additive manufacturing apparatus. Sensor values derived from these sensors (even the sensor for capturing another parameter of the build process) may be correlated with coordinate values corresponding to a position of the material being consolidated at the time of capture (taking into consideration of differences between the capture time and the event that generated the signal (for example, time of flight of acoustic signals)) and visualised at these positions. This may be advantageous for correlating the sensor values with defects in the object, for example as determined from other sensors of the additive manufacturing apparatus or a post-build measurement process, such as a CT scan.

According to a fourteenth aspect of the invention there is provided a system comprising a processor, the processor arranged to carry out the method of the thirteenth aspect of the invention.

According to a fifteenth aspect of the invention there provided a data carrier having instruction stored thereon, which, when executed by a processor causes the processor to carry out the method of the thirteenth aspect of the invention.

The data carrier may be a suitable medium for providing a machine with instructions such as non-transient data carrier, for example a floppy disk, a CD ROM, a DVD ROM/RAM (including −R/−RW and +R/+RW), an HD DVD, a Blu Ray™ disc, a memory (such as a Memory Stick™, an SD card, a compact flash card, or the like), a disc drive (such as a hard disc drive), a tape, any magneto/optical storage, or a transient data carrier, such as a signal on a wire or fibre optic or a wireless signal, for example a signals sent over a wired or wireless network (such as an Internet download, an FTP transfer, or the like).

DESCRIPTION OF EMBODIMENTS

Figure 1:
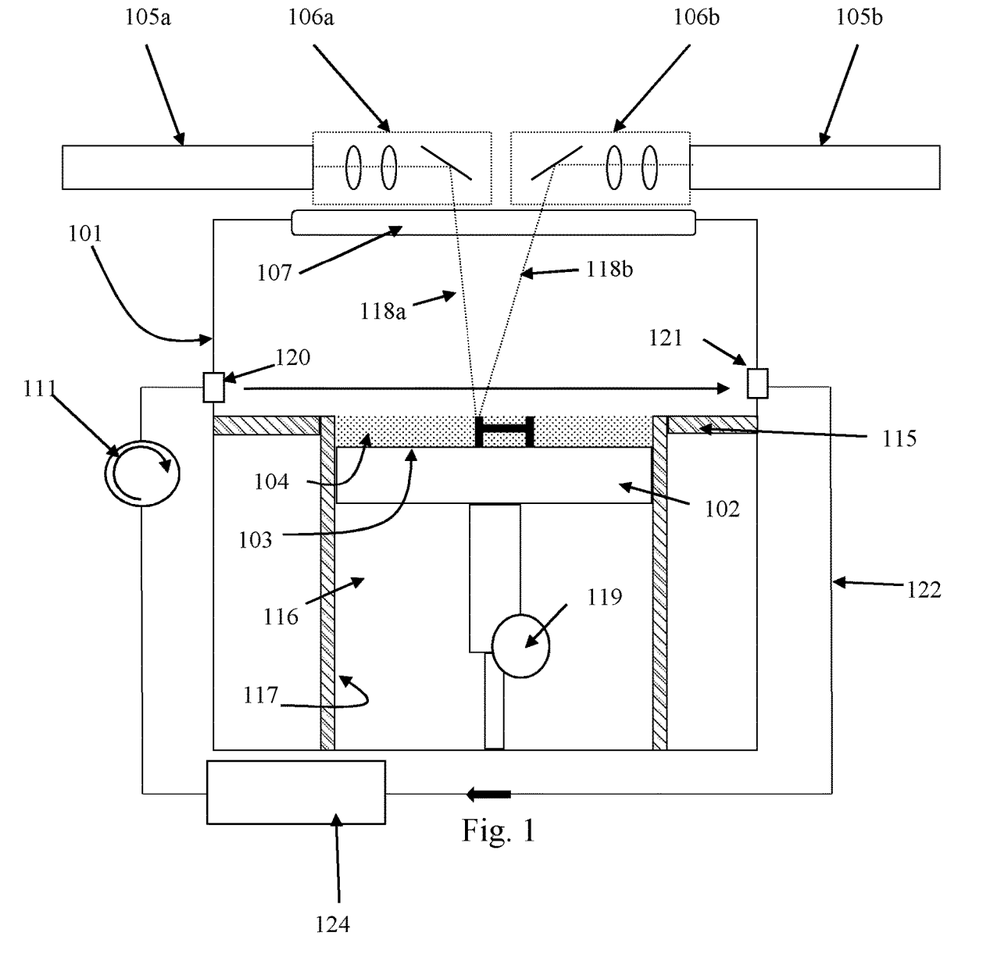
FIG. 1 is a schematic illustration of an additive manufacturing apparatus according to one embodiment of the invention.
Figure 2:
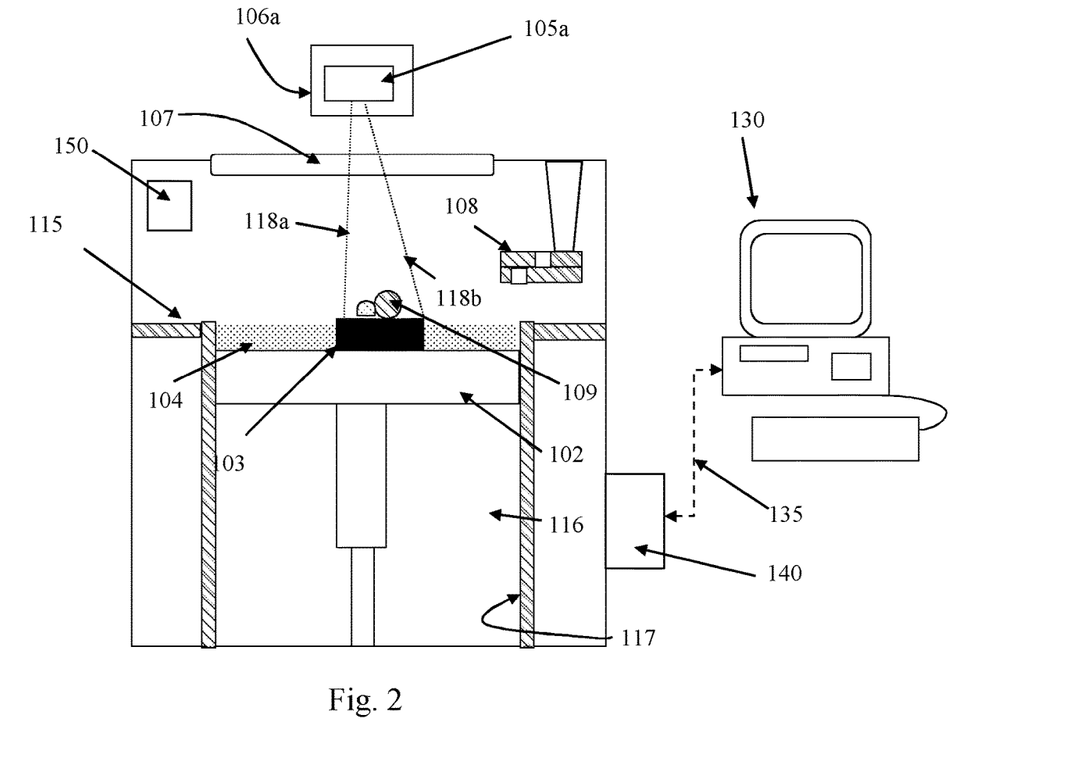
FIG. 2 is a schematic illustration of the additive manufacturing apparatus shown in FIG. 1 from another side.
Figure 3:
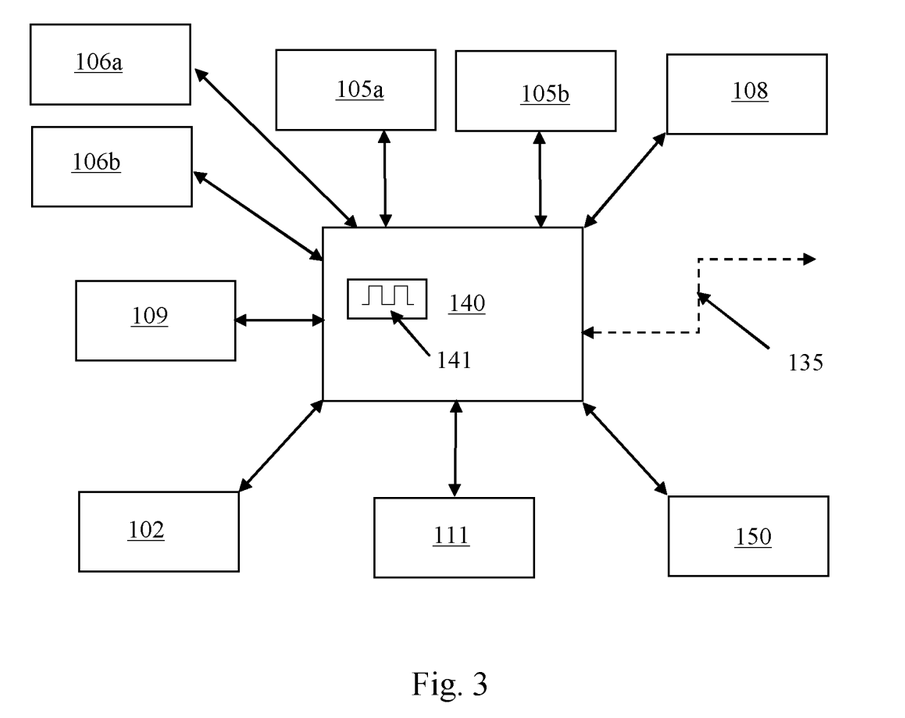
FIG. 3 is a schematic illustration of a system architecture of the additive manufacturing apparatus.

Referring to FIGS. 1 to 3, an additive manufacturing apparatus according to an embodiment of the invention comprises a main chamber 101 having therein partitions 115, 117 that define a build chamber 116 and a surface onto which powder can be deposited. A build platform 102 is provided for supporting a workpiece 103 built by selective laser melting powder 104. The platform 102 can be lowered within the build chamber 116 under the control of motor 119 as successive layers of the workpiece 103 are formed. A build volume available is defined by the extent to which the build platform 102 can be lowered into the build chamber 116.

Layers of powder 104 are formed as the workpiece 103 is built by dispensing apparatus 108 and a wiper 109. For example, the dispensing apparatus 109 may be apparatus as described in WO2010/007396. A plurality of laser modules, in this embodiment two laser modules 105a, 105b, generate lasers 118a, 118b for melting the powder 104, the lasers 118a, 118b directed as required by corresponding optical modules 106a, 106b. The laser beams 118a, 118b enter the chamber 101 via a window 107.

The apparatus further comprises a gas nozzle 120 and gas exhaust 121 for generating a gas flow across the build surface (surface of the powder bed). The gas flow is generated by a pump 111 of a gas recirculation loop 122. A filter assembly 124 filters particles that become entrained in the gas flow from the recirculated gas.

The apparatus further comprises a sensor 150 for generating signals indicative of the build environment. For example, the sensor may be a sensor as described in WO2015/040433 and/or PCT/GB2016/051720, a thermal camera, a visible light camera or other suitable sensor for use in additive manufacturing.

A controller 140 is in communication with modules of the additive manufacturing apparatus, namely the laser modules 105a, 105b, optical modules 106a, 106b, build platform 102, dispensing apparatus 108, wiper 109, pump 111 and sensor(s) 150. In this embodiment, the network of modules and controller 140 is shown as a star network but other configurations could be used, such as a ring network. The controller 140 controls the modules based upon commands in a build file.

Figure 4:
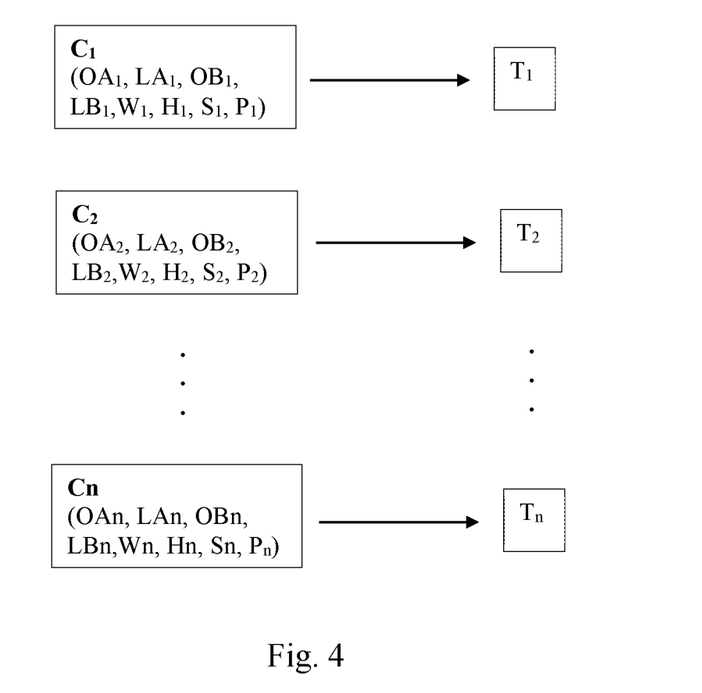
FIG. 4 is a schematic illustration of a build file according to one embodiment of the invention.

As shown in FIG. 4, the build file comprises a plurality of commands $C_1$ to $C_n$ to be executed by the controller 140 of the additive manufacturing apparatus. In FIG. 4, each command $C_1$ to $C_n$ comprises a required state OA, LA, OB, LB, W, H, S, P for the optical module 106a, laser 105a, optical module 106b, laser 105b, wiper 109, dispensing apparatus 108, build platform 102 and pump 11, respectively. Execution of the commands $C_1$ to $C_n$ by the controller 140 causes the controller 140 to generate signals that cause the modules to assume the required states as defined in each command. For example, the signals may cause the optical modules 106a, 106b, wiper 108 and/or build platform 102 to move to a required position, the dispensing apparatus to dose powder, the lasers 105a, 105b to switch on or off or to alter the laser power and/or for the pump 111 to switch on or off or change speed.

Each command is associated with an identifier T identifying a time at which the command C is to be executed. In this embodiment, the times are times from a start of the build (a time at which the first command is executed). The controller 140 comprises a clock 141 and uses clock signals from clock 141 to determine the time since the start of the build. The controller 140 executes each command $C_1$ to $C_n$ in accordance with the time identified by the associated identifier $T_1$ to $T_n$.

A time resolution and location at which the deterministic control is carried out will depend on the arrangement of the additive manufacturing apparatus and requirements for deterministic control. The modules 105a, 105b, 106a, 106b, 102, 108, 111 may have their own local processors (not shown) for interpreting the signals from controller 140 and controlling the module 105a, 105b, 106a, 106b, 102, 108, 111 as appropriate. The signal sent to a module by the controller 140 may comprise a general instruction that is to be implemented by a number of devices at the module 105a, 105b, 106a, 106b, 102, 108, 111 and/or in a number of steps. For example, the controller 140 may send an instruction to an optical module 105a, 105b to expose a defined line (vector) to the laser beam using a series of point exposures separated by a defined point distance, each exposure being carried out for a set exposure time. The local processor of the optical module may execute this instruction by causing appropriate movements of galvanometers that control steerable mirrors for directing the laser beam 118. This may include the generation of a number of time spaced signals to cause movement of the galvanometers by the local processor of the optical module 105 to achieve the desired point spacing and exposure times. However, unlike the commands executed by the controller 140, neither the signals received by the optical module 105 from the controller 140 nor those received by the galvanometers from the local processor are associated with an identifier identifying a time at which the commands should be executed by the device (optical module or galvanometer). The instructions are executed upon receipt by the device.

In an alternative embodiment, the deterministic execution of commands is carried out at the modules rather than by the central controller 140. Each or at least some of the modules may comprise local processors and local clocks. At the start of a build, the central controller 140 may synchronise the local clocks to the master clock 141 of the controller 140. The controller 140 then sends out commands to the modules, each command associated with an identifier identifying a local time (as determined using the local clock) at which the command is to be executed by the module. The commands can then be queued at the modules and executed at the identified time.

The controller 140 also receives sensor data from sensor(s) 150 and associates the sensor data received at a particular time, as determined from clock 141, with a time stamp. The sensor data can then be correlated with the commands associated with an identifier for a corresponding time such that the actions being carried out by the additive manufacturing apparatus at the time the sensor data is generated can be determined.

The build file is generated at a remote computer 130 and sent to the controller 140 via a suitable communication link.

The software for designing the build determines scan paths for the laser beams 118a, 118b to follow when consolidating material in manner is described in WO2014/207454. Once the scan paths have been determined, the allocation of the laser beam 118a, 118b to the scanning of the scan paths is determined, for example, using the method described in WO2014/199134. In the Figures, scanning of the layers is carried out synchronously with spreading of powder with the wiper 108a and lowering of the build platform 102, as described in WO 2015/140547. Accordingly, a timing at which the scans are performed by a laser beams 118a, 118b will depend on a position of the wiper 108 as well as a set speed for the scans. From the allocation of the laser beams 118a, 118b to the scan paths and the set scan speed (initial scan parameters), appropriate scan parameters, such as point distance and exposure time, laser power and spot size can be determined. The appropriate scan parameters may be determined using a thermal/energy model which determines an amount of energy to be input into a region to achieve a desired consolidation (melt) taking into account the energy input into adjacent regions and an amount of cooling that occurs between the consolidations of adjacent regions.

Commands are then generated in accordance with the scan parameters and scan paths, the software determining a time during the build at which each command is to be executed by the additive manufacturing apparatus to achieve the desired scan, and the determined time is identified in the identifier associated with the command, as shown in FIG. 4.

The instructions determined by computer 130 can then be uploaded to the controller 140 when the user wants to carry out the build.

Figure 5:
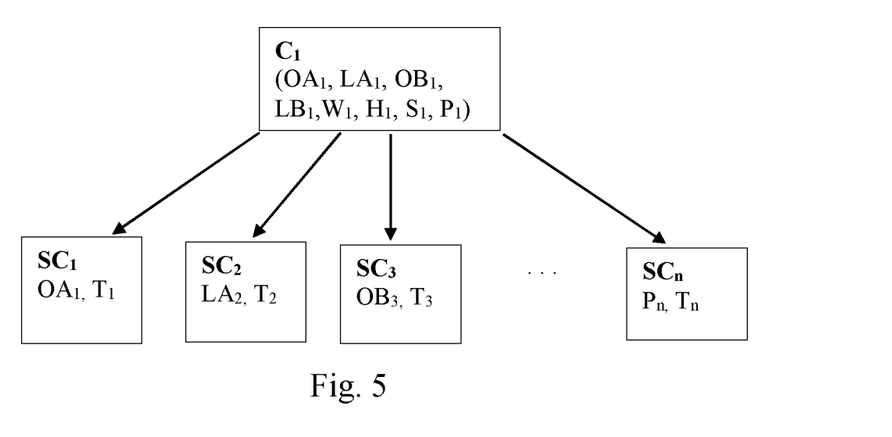
FIG. 5 is a schematic illustration of a generation of sub-commands by a controller of the additive manufacturing apparatus.
Figure 6:
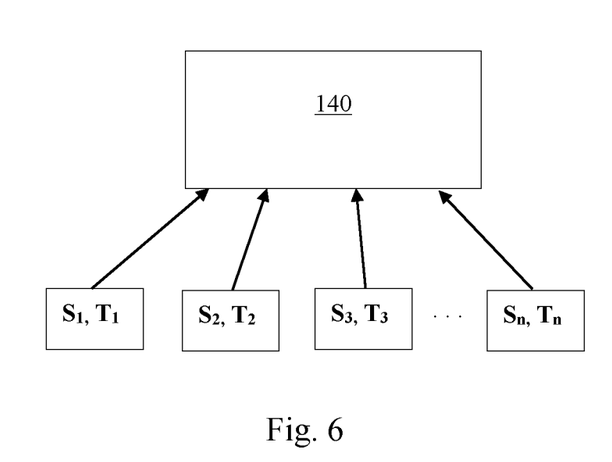
FIG. 6 is a schematic illustration of the reporting of sensor data packages to the controller.
Figure 7:
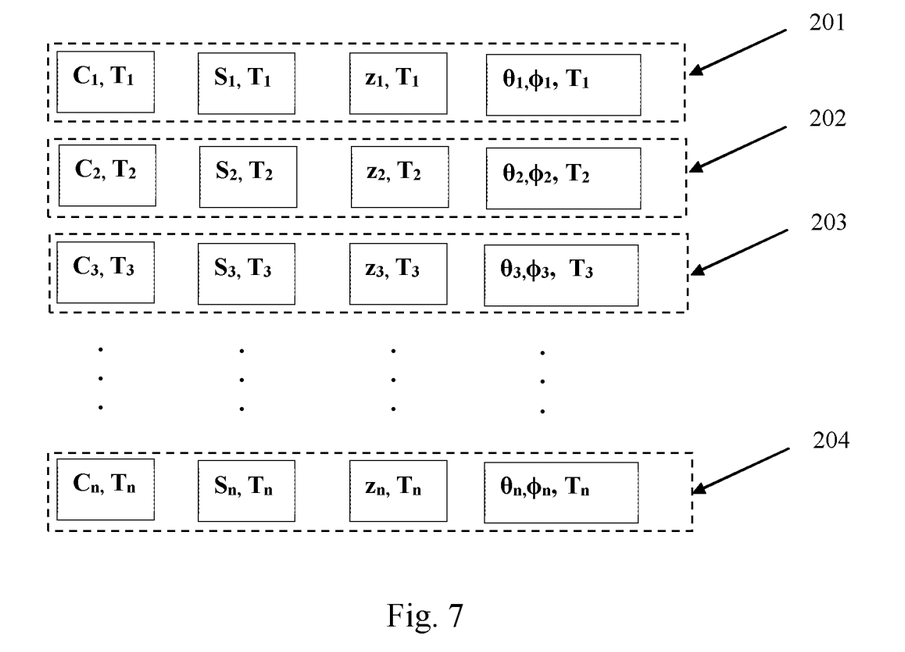
FIG. 7 is a schematic illustration of output data packages according to the invention.

Referring to FIGS. 5 to 7, in one embodiment, on execution of the commands at the specified time, the controller 140 generates sub-commands SC for the sub-systems 106, 106, 108, 109, 102. The sub-commands SC include the command(s) to executed by the sub-system and the identifier T of the command C which caused the sub-commands to be generated. For the sub-systems, the sub-commands SC include commands to take a sensor reading for one or more sensors present in the subsystem. For example, the laser 105 or optical module 106 comprises a sensor for measuring laser beam power and the optical module (further) comprise position encoders for measuring the position of galvanometers and sensors for capturing images and or other data on the melt pool formed to consolidate material. The powder dispenser 108 comprises sensors for measuring a position of an auger or movable plate, which controls dispense of powder from the hopper, and/or a sensor for measuring an amount of powder in the hopper. The wiper 109 comprises a position encoder for measuring a position of the wiper 109 and/or (an array of) metrology sensors for measuring a z-height of solidified material projecting from the powder bed. The z-axis comprises a position encoder for measuring a position of the build platform 102. The apparatus may comprise other sensors, such as acoustic sensors for recording sound/pressure waves generated by the additive build process and/or an oxygen sensor for measuring an oxygen content in the build chamber 101.

On receiving the sub-command, the sub-system executes the sub-command immediately, which, for the sub-commands including a command to take a sensor reading, involves the recording of a sensor value $S_1$ to $S_n$. The sub-system forms a sensor data package including the sensor value $S_1$ to $S_n$ and the identifier $T_1$ to $T_n$ contained in the sub-command which caused the sensor value to be captured. The sensor data package is sent to the master controller 140 as shown in FIG. 6.

With reference to FIG. 7, the sensor values $S_1$ to $S_n$ are packaged together with other sensor values from other sensors z, θ, φ and commands C labelled with the same identifier T into an output data package 201 to 204. A position in a working plane, build volume and/or on the component that was being consolidated at the time that the sensor value S was captured can be determined from the relevant sensor values z, θ, φ or demand position contained in the command C.

The position may be determined from the outputs θ, φ from position encoders measuring the position of steering mirrors used to steer the laser beam onto the working plane and a measured position z of the build platform 102. By using the measured positions, the consolidation position at the time of capture of the sensor value can be determined taking into account differences between the demand position and the actual position. However, the position could also be determined from the demand position in the command C.

The data packages 201 to 204 are output to a visualisation apparatus, such as computer 130 and the sensor data S displayed in a two or three dimensional representation in respect of a capture location on the object. The sensor data that is visualised may be sensor data relating to the melt pool formed during consolidation (for example as determined from radiation collected by the optical module 106 or at least one acoustic sensor) or other sensor data that may affect the quality of the object, such as oxygen content in the build chamber 101 at the time each region of the object was consolidated. This is possible through the known timing at which events occur during the build.

In one embodiment, the determination of the identifier to be included in a command, C, takes into account delays in the apparatus, such as communication delays and dynamics of the subsystems. The additive manufacturing apparatus may be (periodically) subjected to a calibration routine in which delays in the apparatus are determined. For example, a time difference between sending a command to the laser 105 and a ramping up of the laser power to the demanded power as detected by a photodiode, between sending of a command to move the steering mirrors or focusing optics and measurement of movement of the steering mirrors and/or focusing optics to the demanded position as determined from outputs from the position encoders and/or sending or a command to drive the platform 102 to a position and measurement of movement of the build platform 102 to the demanded position is/are determined. From these time differences, a calibration map or function is generated and used to determine the time at which the master controller 140 should send a sub-command to a subsystem (as determined by the identifier in the command) in order that the action is completed at the desired time (a time offset between sending the command and the desired time of execution of the action). The build preparation software (or other software that converts the scanning instructions into commands) uses the calibration map or function to generate the identifiers for the commands.

If the demand data is used to determine positions to correlate with the sensor values, then the calibration map or function may be used to determine the position of the subsystem at the time of capture of the sensor value. For example, the calibration map or function may indicate that a command C in an output package 201 to 204 having an earlier identifier corresponds to a demand position of a subsystem at the time a sensor value is captured. If the position is a measured position, then it is unlikely that there would be any significant time difference between the sensor values generated by different electronic sensors.

It will be understood that modifications and alterations may be made to the above described embodiments without departing from the invention as defined in the claims. Rather than the time for execution of the commands being defined from a common build start time, the times for different commands may be set relative to different start (zero) times. For example, the scanning commands for a particular layer may be set relative to a start time for the formation of that layer. The control method may be used with other types of additive manufacturing apparatus, for example other powder or resin bed additive manufacturing apparatus, such as stereolithography, or fused deposition modelling apparatus, such as wire arc additive manufacturing apparatus. The method may also be used with subtractive manufacturing apparatus and metrology apparatus.

The invention claimed is:

1. A method of controlling an additive manufacturing apparatus, in which an object is built by consolidating material in a layer-by-layer manner, the method comprising:
   receiving commands to be executed by the additive manufacturing apparatus to cause the additive manufacturing apparatus to carry out a build of an object, each command comprising an identifier identifying a time during the build at which the command is to be executed; and
   executing each command on the additive manufacturing apparatus in accordance with the time identified by the associated identifier, wherein
   the commands are such that execution of the commands at the identified times causes two or more actions of the build to occur simultaneously, the actions being scanning of an energy beam simultaneously with i) scanning of another energy beam, ii) moving of a wiper to form a layer of material, and/or iii) moving of a build platform supporting the object being built.

2. The method according to claim 1, wherein the commands include commands i) for controlling movement of a steering module for steering the energy beam to consolidate material at desired locations, ii) for controlling the movement of the wiper in the formation of a material layer, iii) for controlling the movement of the platform that supports the object as it is built, iv) for controlling a heating device for pre-heating selected areas of a layer of material before consolidation and/or v) for controlling a device for plastically deforming consolidated material before formation of a subsequent layer.

3. The method according to claim 1, wherein the identifier identifies a time relative to a start time of the build.

4. The method according to claim 1, wherein the commands are executed based upon signals from a master clock of a central controller of the additive manufacturing apparatus.

5. The method according to claim 1, wherein the commands are executed based upon signals from a local clock local to a device for executing the commands, the method comprising synchronising the local clock(s) to a master clock of a central controller of the additive manufacturing apparatus.

6. The method according to claim 1, comprising time stamping sensor data obtained by sensors for monitoring the build with a time that can be linked back to actions that were executed at that time.

7. The method according to claim 1, wherein the additive manufacturing apparatus comprises a plurality of subsystems and the commands cause the plurality of subsystems of the additive manufacturing apparatus to carry out the build of the object.

8. The method according to claim 7, wherein each command specifies actions to be carried out by a plurality of the subsystems.

9. The method according to claim 8, wherein execution of each command comprises generating a plurality of sub-commands to be executed by the subsystems.

10. The method according to claim 9, wherein the identifier identifies a time at which a central controller generates sub-commands that are sent to the systems.

11. The method according to claim 7, wherein the plurality of subsystems comprises a sensor for monitoring a parameter of the additive manufacturing process, wherein the commands or sub-commands comprise a sensor command for causing the sensor to capture a sensor value.

12. The method according to claim 11, wherein the sensor command includes the identifier and the method comprises the sensor i) executing the sensor command to capture the sensor value and ii) generating a sensor data package including the sensor value labeled with the identifier contained in the sensor command.

13. The method according to claim 12, comprising associating the sensor value with a defined location in a build volume or the object based upon the identifier labeling the sensor value, wherein the defined location is determined from a demand position at the time identified by the identifier or a further sensor value from a further sensor having a corresponding identifier.

14. The method according to claim 13, wherein the defined location is a capture location for the sensor value.

15. The method according to claim 13, wherein the defined location is a location of a consolidation region at a time the sensor value is captured.

16. The method according to claim 13, comprising visualising the sensor values based upon the defined locations.

17. The method according to claim 1, further comprising executing each of the commands on the additive manufacturing apparatus in accordance with the time identified by the associated identifier such that a timing between actions of the additive manufacturing apparatus in carrying out the build of the object are predetermined.

18. A controller for controlling an additive manufacturing apparatus, in which an object is built by consolidating material in a layer-by-layer manner, the controller comprising a processor, wherein the processor is arranged to carry out the method of claim 1.

19. The controller according to claim 18, comprising a master clock, wherein the processor is arranged to cause the additive manufacturing apparatus to execute commands based upon signals from the master clock and the times specified by the identifier associated with each command.

20. An additive manufacturing apparatus comprising the controller according to claim 18.

21. The additive manufacturing apparatus according to claim 20, comprising two or more devices used for consolidating material in layers, the controller arranged to cause execution of commands such that the two or more devices carry out actions simultaneously.

22. The additive manufacturing apparatus according to claim 21, wherein the devices comprise a combination of one or more i) steering devices for steering one or more of the energy beams or plasma jets, ii) the wiper for forming the layer of material, and/or iii) the movable build platform supporting the object.

23. A non-transient data carrier having instruction stored thereon, which, when executed by a processor of an additive manufacturing apparatus causes the processor to carry out the method of claim 1.

24. A method of controlling an additive manufacturing apparatus, in which an object is built by consolidating material in a layer-by-layer manner, the additive manufacturing apparatus comprising steering devices for steering energy beams and a controller for controlling the additive manufacturing apparatus, and the method comprising:
  receiving commands to be executed by the additive manufacturing apparatus to cause the additive manufacturing apparatus to carry out a build of an object, wherein each command comprises an identifier identifying a time during the build at which the command is to be executed by the controller; and
  executing each of the commands on the additive manufacturing apparatus with the controller in accordance with the time identified by the associated identifier to cause scanning of one of the energy beams simultaneously with scanning of another of the energy beams such that a timing between the scanning of the energy beams is predetermined.

25. A method of controlling an additive manufacturing apparatus, in which an object is built by consolidating material in a layer-by-layer manner, the additive manufacturing apparatus comprising (i) steering devices for steering energy beams, (ii) a wiper for forming each layer, and (iii) a controller for controlling the additive manufacturing apparatus, and the method comprising:
  receiving commands to be executed by the additive manufacturing apparatus to cause the additive manufacturing apparatus to carry out a build of an object, wherein each command comprises an identifier identifying a time during the build at which the command is to be executed by the controller; and
  executing each of the commands on the additive manufacturing apparatus with the controller in accordance with the time identified by the associated identifier to cause scanning of one of the energy beams simultaneously with moving of the wiper to form a layer of material.

* * * * *